D. H. DEERY.
RESILIENT TIRE.
APPLICATION FILED FEB. 6, 1913.
1,084,731.
Patented Jan. 20, 1914.
2 SHEETS—SHEET 1.
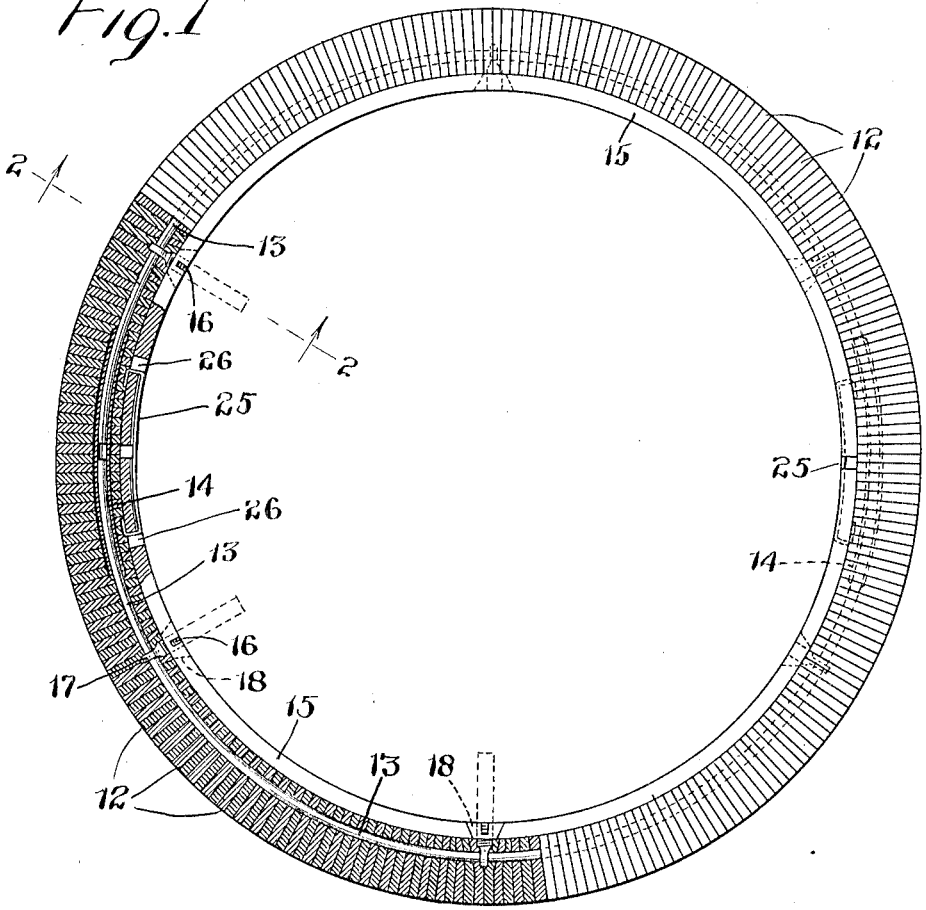
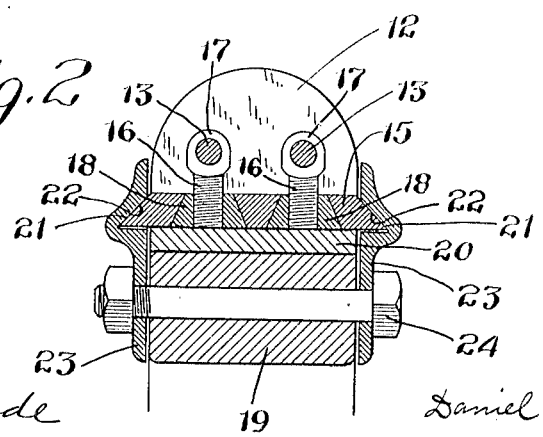
WITNESSES:
H. W. Meade
S. W. Atherton.
INVENTOR
Daniel H. Deery
BY
A. M. Wooster
ATTORNEY D. H. DEERY.
RESILIENT TIRE.
APPLICATION FILED FEB. 6, 1913.
1,084,731.
Patented Jan. 20, 1914.
2 SHEETS—SHEET 2.
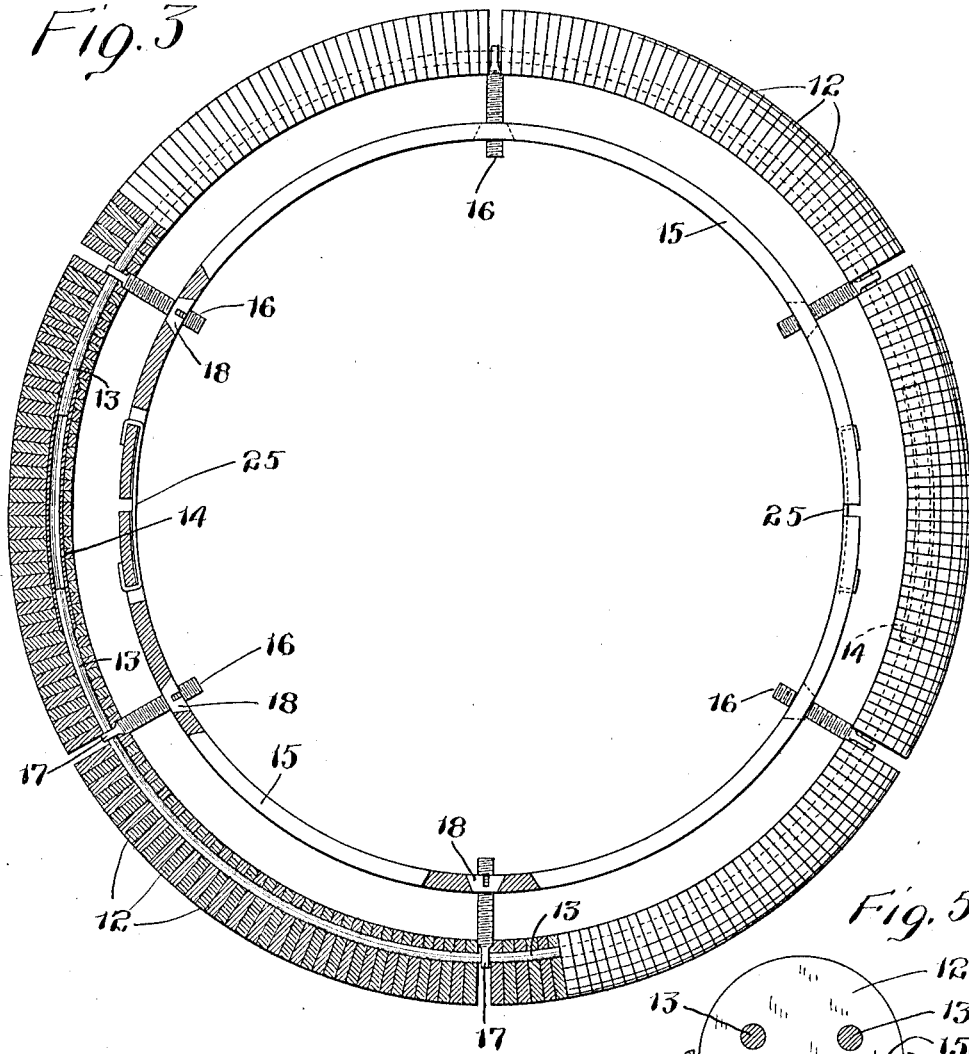
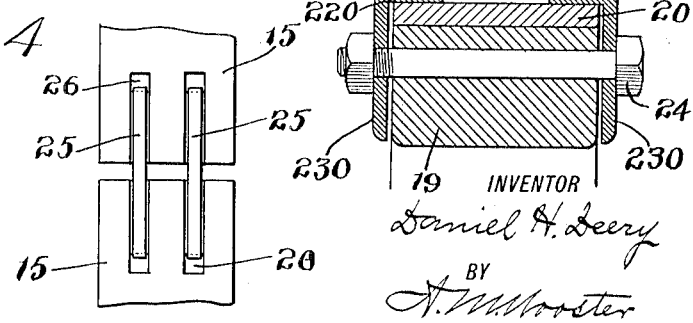
WITNESSES:
H. W. Meade
S. W. Atherton
INVENTOR
Daniel H. Deery
BY
A. M. Wooster
ATTORNEY

UNITED STATES PATENT OFFICE.

DANIEL H. DEERY, OF BRIDGEPORT, CONNECTICUT.

RESILIENT TIRE.

1,084,731.

Specification of Letters Patent.

Patented Jan. 20, 1914.

Application filed February 6, 1913. Serial No. 746,574.

*To all whom it may concern:*

Be it known that I, DANIEL H. DEERY, a citizen of the United States, residing at Bridgeport, county of Fairfield, State of Connecticut, have invented an Improvement in Resilient Tires, of which the following is a specification.

This invention relates to resilient tires, especially those adapted for heavy vehicles, such, for example, as automobile trucks, and has for its object to provide improved means for holding a series of resilient tire sections under a state of high compression, thereby producing a relatively inexpensive tire having a tread surface which, while sufficiently resilient to meet all the requirements of such a tire, is relatively hard, impervious to water, and extremely durable.

With these and other objects in view I have devised the novel tire which I will now describe, reference being had to the accompanying drawings forming a part of this specification and in which:

Figure 1 is a side elevation, partly in section, of the completed tire; Fig. 2 is a section on the line 2—2, Fig. 1, and showing the tire in place on the wheel; Fig. 3 is a view similar to Fig. 1 showing the positions of the parts prior to applying the pressure thereto; Fig. 4 is a detail view of the means for connecting the sections of the segmental tire rim; Fig. 5 is a view similar to Fig. 2 showing a modification.

12 denotes the tire sections which are of a flat form and are arranged face to face circumferentially of the tire. Said sections may be made of any suitable resilient material, such as vulcanized fiber, rubber, compressed paper, or any of the various plastic compositions, but preferably are composed of chrome tanned sole leather seasoned with oil and compressed, this material having been found to produce a tread that is waterproof, exceedingly durable, and not injuriously affected by heavily oiled roads.

13 denotes one or more (herein two) outer circumferentially contractible rings extending around the tire and passing through registering openings in the sections 12. Preferably each of said rings comprises two or more segmental rods, the ends of which are connected by sleeves 14 into which said rods telescope.

15 denotes an inner, outwardly rigid tire base or rim and 16 bolts having eyes 17 through which the rods or rings 13 pass loosely, and provided with nuts 18 which are received in countersunk recesses in the base or rim 15.

In assembling, the sections 12 are passed over the rings or rods 13 and the sleeves 14 until a sufficient number have been assembled, as shown in Fig. 3. The nuts 18 are then tightened on the bolts 16, thereby drawing the rings 13 inwardly toward the outwardly rigid base or rim 15. This causes the rings 13 to be contracted circumferentially, said rings sliding freely through the eyes 17 and the ends thereof telescoping into the sleeves 14, as will be clear from a comparison of Figs. 1 and 3. The circumferential contraction of the rings 13 causes the sections 12 to be tightly compressed against one another. When the bases of the sections 12 have been brought into engagement with the rim 15 the projecting ends of the bolts 16 (shown in dotted lines in Fig. 1) are cut off and the tire is ready for attachment to the wheel. If preferred, the circumferential contraction of the rings and compression of the sections may be effected by an ordinary tire setting machine and the nuts then tightened up to retain the compression.

19, Fig. 2, denotes the felly or rim of a wheel which, as shown, is provided with the usual metal outer or auxiliary rim 20. The tire base or rim 15 is preferably formed with beveled or inclined edges 21 which are received in correspondingly beveled or inclined grooves 22 in attaching plates 23 secured to the felly or rim 19 by bolts 24. The tire base or rim 15, while outwardly rigid, is preferably circumferentially contractible, and to this end, as shown in Figs. 1 and 3, is formed of two segmental sections connected by links 25 (see also Fig. 4) which pass through openings 26 in said sections adjacent their ends. The links 25, while preventing circumferential expansion of the base or rim 15, as above explained, permit circumferential contraction thereof, so that when the bolts 24 are tightened to draw the attaching plates 23 inwardly against the felly 19, the inclined surfaces 22 on said plates coöperating with the inclined surfaces 21 on the tire rim 15 will draw said tire rim inwardly against the wheel rim 20, contracting said tire rim and, through the bolts 16, further contracting the rings 13 and further compressing the tire sections 12.

In Fig. 5 is shown a construction in which a solid or non-contractible tire base or rim 150 is employed, said rim being formed at its inner side with inclined surfaces 210. The attaching plates 230 employed in this form of the invention are provided with inclined or wedge-shaped lugs 220 coöperating with the inclined surfaces 210 and forced inwardly when the bolts 24 are tightened between the tire base or rim 150 and the wheel rim 20, thereby tightening the tire on the wheel without, however, further compressing the tire sections 12, as in the form of the invention first described.

Having thus described my invention I claim:

1. A tire comprising a circumferentially arranged series of sections of resilient material, a base, and means for securing the sections under compression upon the base comprising circumferentially contractible rings passing through apertures provided therefor in the bottom of the sections and through eye-bolts having their shanks extending through the base, the base countersunk about the shank of each eye-bolt and a nut correspondingly shaped upon the eye-bolt holding the sections under compression with the heads flush with the inner side of the base.

2. A tire comprising a circumferentially arranged series of relatively thin sections of resilient material, a base, and means securing the sections under compression upon the base comprising circumferentially contractible sectional rings and connecting sleeves passing through apertures provided therefor in the bottom of the sections and through eye-bolts having screw threaded shanks passing through the base, said base countersunk about each shank and correspondingly shaped nuts upon the shanks placing the sections under compression with the exterior faces of the nuts and ends of the shanks flush with the inner surface of the base.

In testimony whereof I affix my signature in presence of two witnesses.

DANIEL H. DEERY.

Witnesses:
 EDLA M. CULVER,
 S. W. ATHERTON.

---

Copies of this patent may be obtained for five cents each, by addressing the "Commissioner of Patents, Washington, D. C."